US012066058B2

(12) United States Patent
Baracca et al.

(10) Patent No.: US 12,066,058 B2
(45) Date of Patent: Aug. 20, 2024

(54) FASTENING FOR A SUPPORT ASSEMBLY FOR FOOD APPLICATIONS

(71) Applicant: AKTIEBOLAGET SKF, Gothenburg (SE)

(72) Inventors: Fausto Baracca, Massa (IT); Fabio Falaschi, Carrara (IT); Fabio Cavacece, Rome (IT)

(73) Assignee: AKTIEBOLAGET SKF (SE)

( * ) Notice: Subject to any disclaimer, the term of this patent is extended or adjusted under 35 U.S.C. 154(b) by 0 days.

(21) Appl. No.: 18/379,732

(22) Filed: Oct. 13, 2023

(65) Prior Publication Data

US 2024/0044372 A1  Feb. 8, 2024

Related U.S. Application Data

(63) Continuation of application No. 17/712,215, filed on Apr. 4, 2022, now Pat. No. 11,828,330.

(30) Foreign Application Priority Data

Apr. 12, 2021 (IT) .......................... 102021000008996

(51) Int. Cl.
*F16C 33/72* (2006.01)
*F16C 33/78* (2006.01)
*F16C 35/04* (2006.01)

(52) U.S. Cl.
CPC .......... *F16C 33/723* (2013.01); *F16C 33/782* (2013.01); *F16C 35/045* (2013.01); *F16C 2226/72* (2013.01)

(58) Field of Classification Search
CPC ...... F16C 23/08; F16C 23/082; F16C 23/084; F16C 33/723; F16C 33/726; F16C 33/768;

(Continued)

(56) References Cited

U.S. PATENT DOCUMENTS

| 4,687,211 A | 8/1987 | Bessone |
| 10,190,636 B2 * | 1/2019 | Falaschi ................ F16C 35/045 |

(Continued)

FOREIGN PATENT DOCUMENTS

| WO | 2016156962 | 10/2016 |
| WO | WO-2016156963 A1 * | 10/2016 ............ F16C 33/723 |

OTHER PUBLICATIONS

Search Report for corresponding Italian Patent Application No. 10202100008996 dated Dec. 3, 2021.
U.S. Appl. No. 17/712,215.

*Primary Examiner* — Alan B Waits
(74) *Attorney, Agent, or Firm* — Reed Smith LLP

(57) ABSTRACT

A sealing system includes a casing with an internal seat, a front edge, an opening, and a radially external lateral surface defining an annular seat. The annular seat includes an annular groove axially spaced from the front edge, itself including one or more mechanical stops, and a plurality of axial grooves connected to the annular groove and interrupting radially at least part of the front edge. The annular groove defines a bottom wall provided with projections spaced from one another and defining depressions, the projections circumferentially offset from the axial grooves. The sealing system further includes a cover with a bottom wall and an annular coupling portion. A radially inner surface of the annular coupling portion includes teeth projecting radially inward and spaced circumferentially from each other. The annular seat is configured to receive the at least one pair of teeth of the annular coupling portion of the cover.

10 Claims, 4 Drawing Sheets

(58) Field of Classification Search
CPC ........ F16C 35/00; F16C 35/04; F16C 35/042; F16C 35/045; F16C 2226/70; F16C 2226/72
See application file for complete search history.

(56) References Cited

U.S. PATENT DOCUMENTS

| | | | |
|---|---|---|---|
| 11,460,074 B2* | 10/2022 | Missiaggia | F16C 33/723 |
| 2022/0325754 A1* | 10/2022 | Baracca | F16C 33/7886 |
| 2022/0325755 A1* | 10/2022 | Baracca | F16C 33/80 |
| 2022/0325759 A1* | 10/2022 | Frezza | F16C 33/76 |

* cited by examiner

FASTENING FOR A SUPPORT ASSEMBLY FOR FOOD APPLICATIONS

CROSS-REFERENCE TO RELATED APPLICATIONS

This application is a continuation of U.S. patent application Ser. No. 17/712,215 filed on Apr. 4, 2022, and is based on and claims priority to Italian Patent Application No. 102021000008996 filed on Apr. 12, 2021, under 35 U.S.C. § 119, the disclosure of which is incorporated by reference herein.

FIELD

The present disclosure relates to a novel fastening system between the casing and the cover of a support assembly for food applications. In particular, the support assembly is fixed to a machine frame and is intended to support movable shafts, for example rotating shafts, by means of a suitable bearing unit.

The novel fastening system improves the mounting of the cover on the casing, and especially the sealing performance.

BACKGROUND

In the food industry (also known as "food and beverages", or simply "F&B") there has been an increasing interest in the development of new machines and machine designs intended to improve the safety and quality of foods.

The machines used in the food industry have numerous moving parts supported by rotating or slidable shafts, such as conveyor belts, mixers, and machines for washing fresh foods. All these machines have to be cleaned frequently, usually with water to which detergents and/or disinfectants have been added, in order to control any development of bacterial colonies that might contaminate the foods. In particular, these machines must not have any gaps or other parts where dirt, or even the washing water, can penetrate and stagnate. This is because the stagnation of liquids or moisture favors a possible proliferation of bacteria.

This problem is particularly acute in relation to the support assemblies for movable shafts, which may be of the terminal type, housing a terminal end of the shaft, or of the through type. These support assemblies are formed by a casing, usually annular, having a base or flange for fixing to the machine, a bearing unit, located inside the casing and coupled to the movable shaft, and a cover, normally cup-shaped, which is coupled with a force fit to the casing.

BRIEF DESCRIPTION OF THE DRAWINGS

The invention will now be described with reference to the attached drawings, which show a non-limiting example of its embodiment, in which.

DETAILED DESCRIPTION

Figure 1:
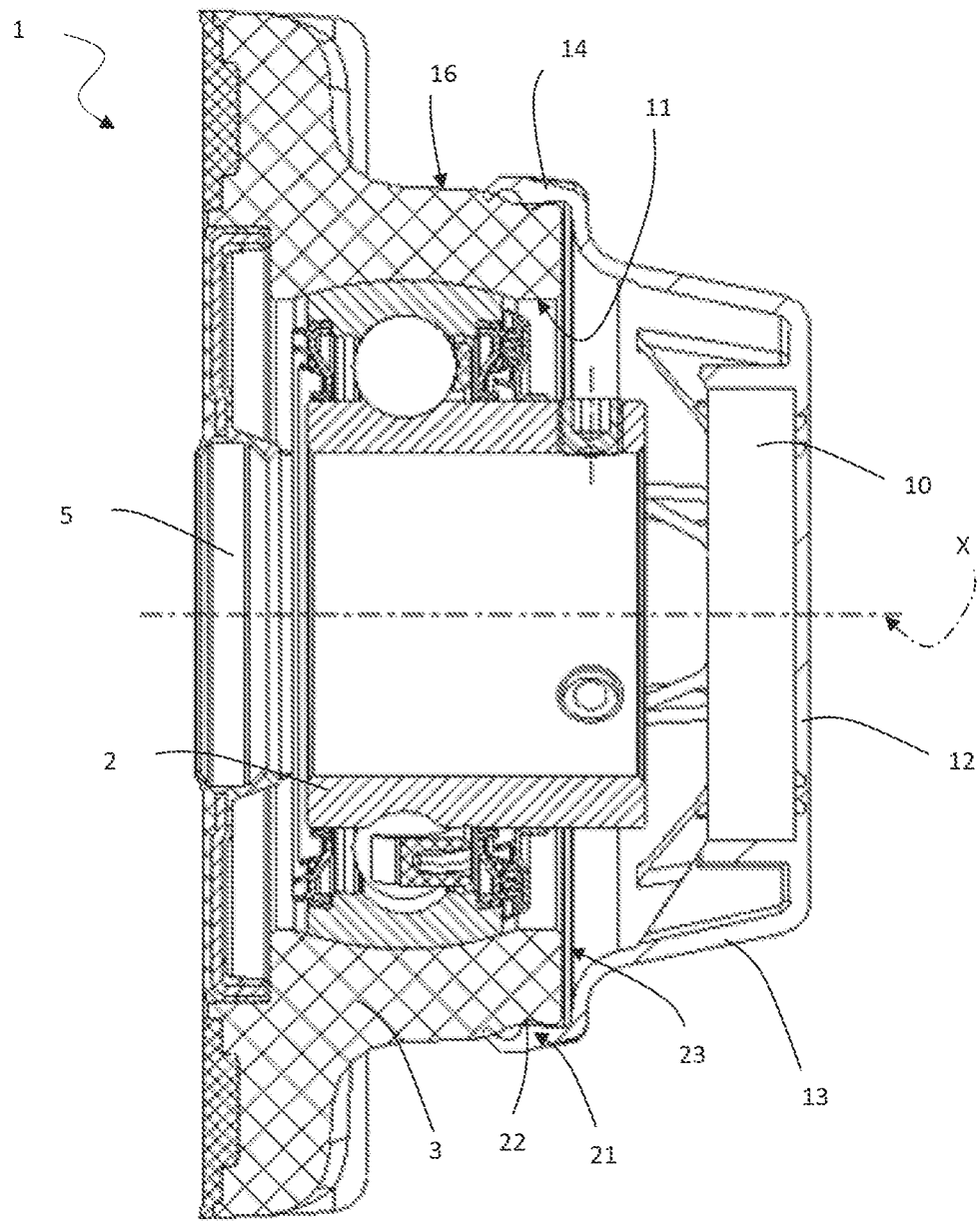
FIG. 1 shows a cross section through the support assembly according to an embodiment of the present invention.

For a forced mounting of a known type, the cover must be fitted, by snap-fitting for example, on the outside of the casing, for example by engaging a groove formed on a radially outer lateral surface of the casing. The cover has a plurality of teeth which engage in the groove of the casing. Inside the groove of the casing there are projections, in the form of ascending and descending ramps, which serve to lock the teeth of the cover in the circumferential direction.

In other words, in the mounting step, the cover is positioned on the casing and the teeth of the cover reach the groove of the casing through corresponding openings on the outer surface of the casing. Then, in a typical bayonet coupling, the cover is rotated and the teeth of the cover travel over corresponding projections along the groove of the casing. The cover is thus locked, although it can still rotate through an arc of circumference as far as the next projection. The two consecutive projections are angularly spaced so that the tooth of the cover is not located next to an opening present on the outer surface of the casing through which it could exit and thus cause the demounting of the cover.

However, this mounting procedure has a margin of uncertainty and insecurity. Firstly, in the mounting step, the angular positioning of the teeth of the cover within the groove of the casing is not precisely defined. The user could be confused and rotate the cover excessively until the following projection also encounters and rides over the tooth, thus causing the inevitable and unwanted demounting of the cover. Secondly, although the two consecutive projections form a barrier against an accidental demounting of the cover, this does not ensure that the tooth of the cover cannot ride over a projection because of excessive vibration due to specific applications, in which case the unwanted demounting of the cover would also occur. Finally, even if accidental demounting does not occur, the fact that the cover still has a degree of angular freedom relative to the casing causes problems for the security of the fluid seal.

It is therefore necessary to define a support assembly that offers a novel design solution capable of resolving, or at least mitigating, the aforementioned drawbacks.

Purely by way of non-limiting example and with reference to the aforesaid figures, the number 1 indicates the whole of an exemplary support assembly for movable, rotating or slidable shafts which, for the sake of simplicity, are not illustrated.

An exemplary support assembly 1 further comprises a bearing unit 2, for example a rolling bearing of a known type, capable of housing in a known way a movable shaft 5, for example a rotating shaft, and a casing 3 having a through seat 4 within which the bearing unit 2 is housed in a stable and known way.

A support assembly 1 is especially useful for mounting on machines for the food industry. For this purpose, a casing 3, which is illustrated in front elevation in FIG. 2, is of the type intended to be mounted in a fixed way on the frame of a known machine, particularly for the food industry, which for the sake of simplicity is not illustrated.

A casing 3 has an annular overall shape and is designed so as to be able to house a bearing unit 2 in a known way within itself, particularly in a through seat 4. A casing further comprises a base or flange 8 for fixing to said frame of a machine. A seat 4 has an overall axis of symmetry X which is also the axis of symmetry of the casing 3.

Figure 2:
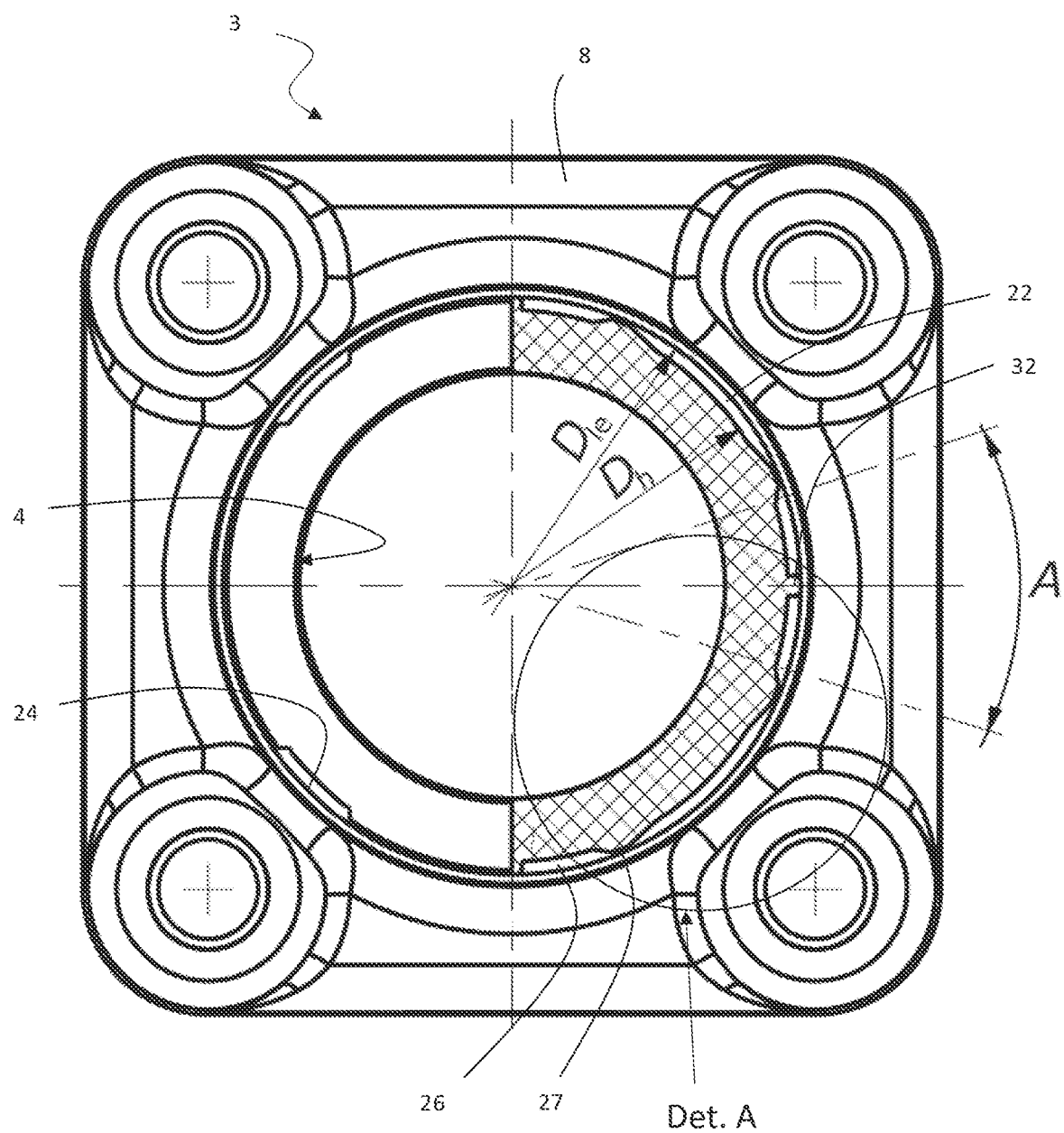
FIG. 2 shows a front elevation of a casing of the support assembly of FIG. 1.

Embodiments of a casing 3 as shown in FIG. 2 are not the only embodiments; for example, a base or flange 8, which is square in the illustrated example, may have any desired symmetrical or asymmetrical shape.

In any case, a support assembly 1 includes a cover 10 for fluid sealing an opening 11 of a through seat 4 of a casing 3.

A cover 10 for a casing 3 is bowl-shaped overall and comprises a bottom wall 12, an annular lateral wall 13 extending transversely relative to the bottom wall 12, and a coupling portion 14 towards the casing 3.

A coupling portion 14 is annular and is designed to be coupled, in use, to a casing 3, laterally on the outside of said casing. In particular, it is shaped as a socket joint and is coupled radially and laterally on to the outside of a radially outer lateral surface 16 of a casing 3.

The lateral surface 16 and the coupling portion 14 are defined by solids of revolution, and have a common axis of symmetry, which, in the illustrated examples, coincides with an axis of symmetry X (FIG. 1) of the cover 10, and which is also the axis of symmetry of a casing 3 and of a through seat 4.

Figure 5:
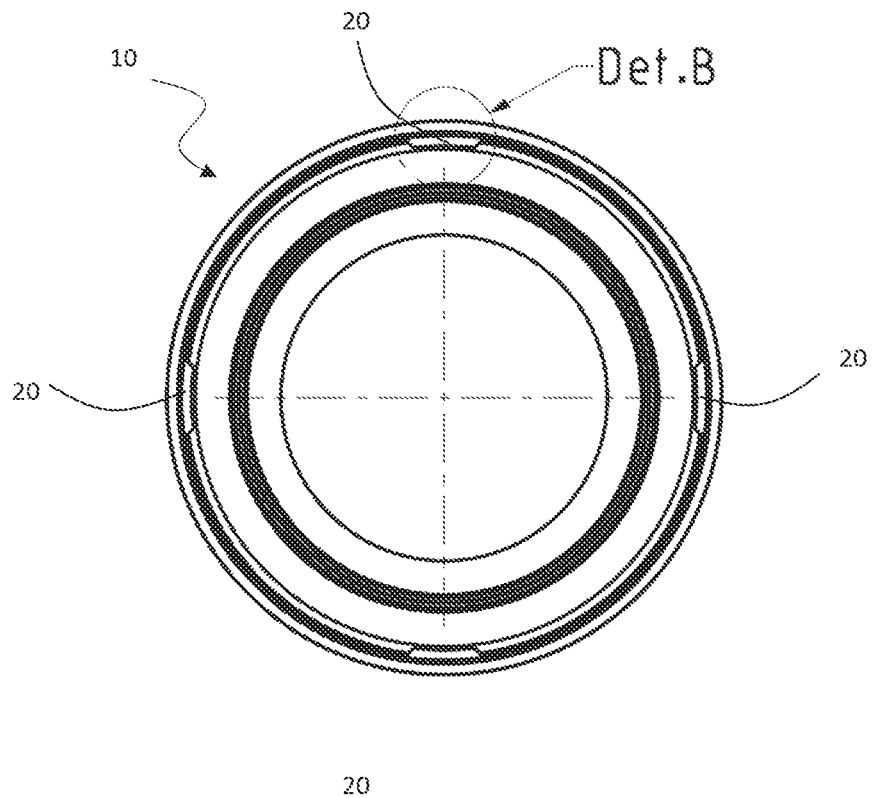
FIG. 5 shows a front view of a cover of the support assembly of FIG. 1.

A coupling portion 14 of a cover 10 is provided radially on the inside with at least one pair of teeth, 20 projecting radially towards the inside of the cover 10 and spaced circumferentially from each other, each of which extends over a limited circumferential portion of the coupling portion; in the non-limiting examples shown in FIG. 5, the teeth 20 are four in number and are spaced at 900 to each other.

In combination with the presence of teeth 20 on a cover 10, a radially outer lateral surface 16 of a casing 3 is provided with an annular seat 21 for receiving teeth 20 of the cover 10. An annular seat 21 consists of an annular groove 22 arranged to be axially spaced with respect to a front edge 23 of a casing 3 delimiting an opening 11 and provided with a number of axial grooves 24 equal to a number of teeth 20 present on a cover 10, these grooves 24 radially interrupting at least part of the front edge 23 of a casing 3.

A bottom wall 25 of an annular groove 22 is circumferentially provided with an alternating plurality of depressions 26 and projections 27 arranged to be circumferentially offset with respect to axial grooves 24.

Axial grooves 24 have a radial depth identical to a radial depth of an annular groove 22 at a position of the axial grooves 24, so that corresponding bottom walls of the axial grooves and a bottom wall 25 of a radial groove 22 lie flush with each other.

Since, in some preferred exemplary embodiments in accordance with this disclosure, a cover 10 has two pairs of teeth 20 arranged to be circumferentially spaced in a symmetrical manner, being offset by 90°, in this case, a radially outer lateral surface 16 of a casing 3 has two pairs of axial grooves 24 arranged to be circumferentially spaced in a symmetrical manner, being offset by 90°. A bottom wall 25 of an annular groove 22 has a plurality of circumferential sectors having the same angular amplitude, consisting of eight depressions 26, of which four are axially delimited by an edge 23 and the other four are free, being arranged at the positions of grooves 24, and eight projections 27. The depressions 26 are delimited by curved surfaces flush with the bottom wall 25 of the annular groove 22, while the projections 27 project radially with respect to the bottom wall 25 of the annular groove 22 and are arranged alternately with the depressions 26.

Figure 3:
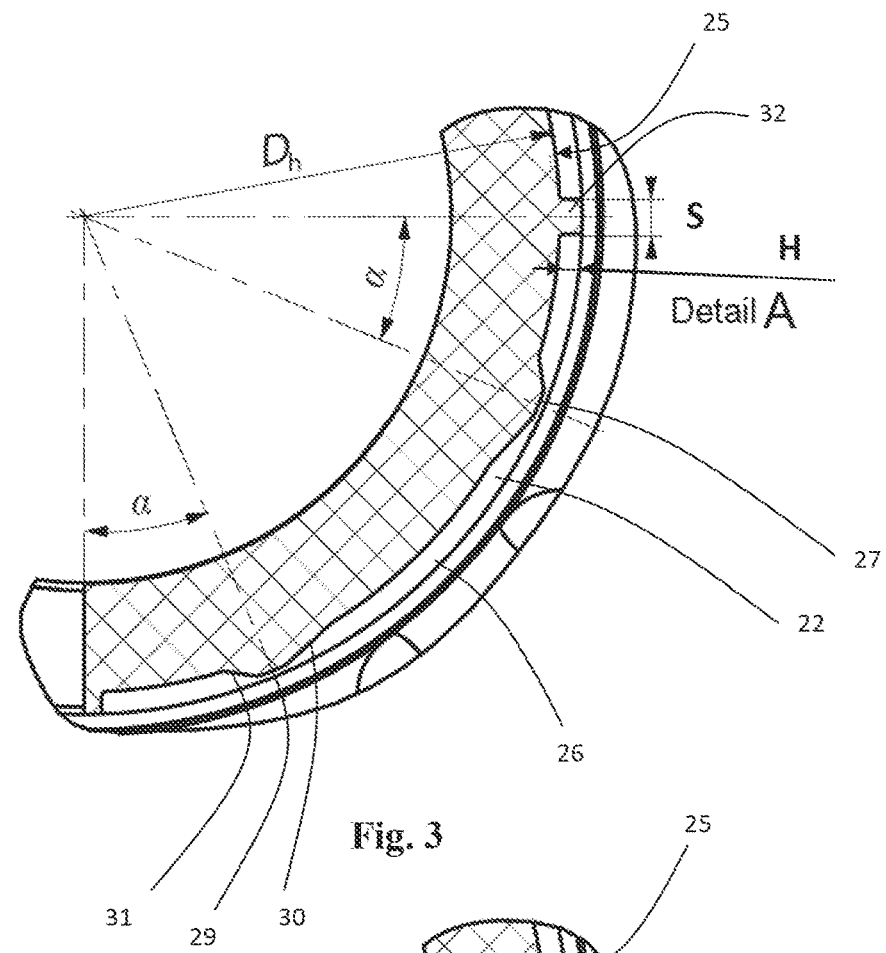
FIG. 3 shows a detail of FIG. 2 on an enlarged scale.
Figure 4:
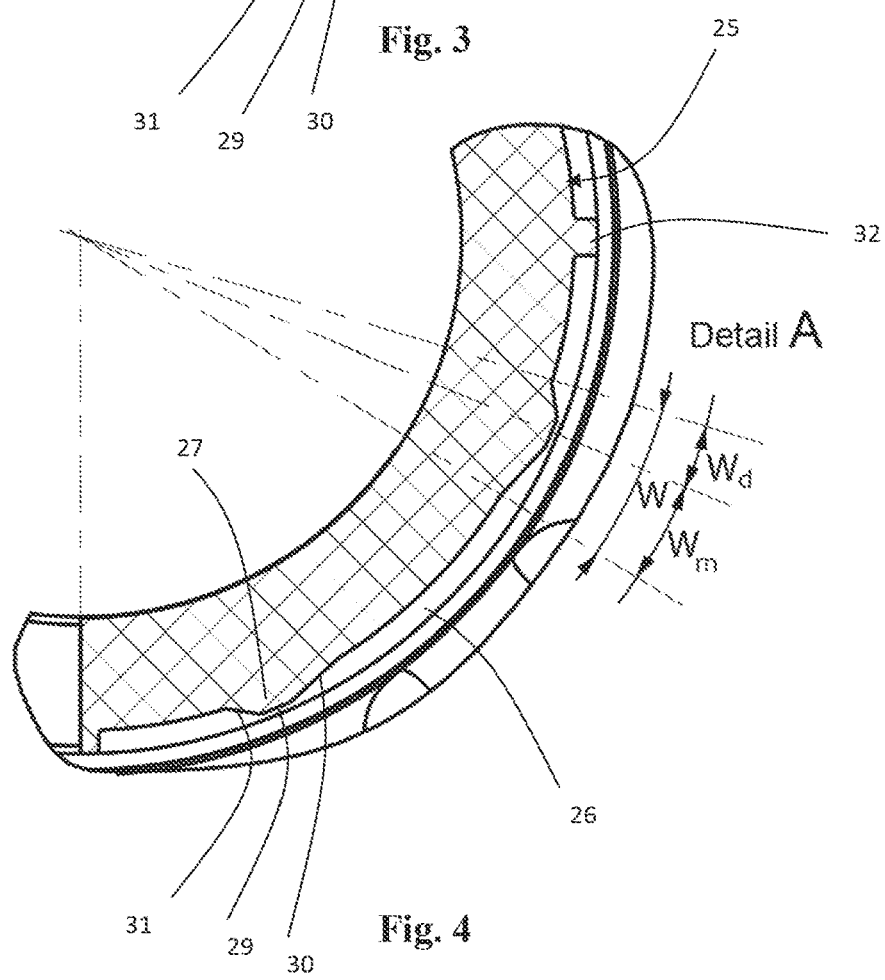
FIG. 4 shows the detail of FIG. 2 on a more enlarged scale.

According to a first aspect, projections 27 of an annular groove 22 (see, e.g., FIGS. 3 and 4) each comprise a first circumferential portion of a flat surface 29 raised with respect to the bottom wall 25 of the annular groove 22 and second and third circumferential portions of flat surfaces 30, 31 which flank the first circumferential portion 29 and which form two inclined planes that connect the first surface portion 29 with the bottom wall 25 of the annular groove 22. Two inclined planes are characterized in that they have different inclinations, and projections 27 therefore take the form of an asymmetric ramp. In particular, as shown in FIGS. 3 and 4, the second circumferential portion of flat surface 30 has a smaller inclination (in other words, it is less steep) than the third circumferential portion of flat surface 31 (which is steeper). The importance of having different inclinations is explained more fully below.

According to another aspect, annular groove 22 has at least one pair of mechanical stops 32 which are further projections with respect to the bottom wall 25 of the annular groove 22. The projections 32 protrude in a radial direction with respect to corresponding depressions 26 and extend flush with the lateral surface 16 of the casing 3. The introduction of this characteristic creates an end stop for the tooth 20 of a cover 10 during a mounting procedure, and a number of mechanical stops 32 is therefore equal to a number of teeth 20 of the cover 10.

In the non-limiting examples, a number of mechanical stops 32, being equal to a number of teeth 20 of a cover 10, is four. Advantageously, according to non-limiting examples, in the circumferential direction, along a groove of a casing that accommodates teeth of a cover, mechanical stops 32 are four in number, while asymmetrical projections 27 are eight in number, in other words twice the number of mechanical stops 32. In practice, there will be two projections 27 located circumferentially on an opposite side from each mechanical stop 32, and the third circumferential portion of flat surface 31 (the one with the greater inclination) will be, circumferentially, on a side nearer the mechanical stop 32.

Because of the presence of mechanical stops 32 and of projections 27 with asymmetrical ramps, it is possible to define a new procedure for mounting cover 10 on casing 3, making it simpler for an operator, and, above all, preventing the occurrence of accidental demounting.

In fact, asymmetrical inclinations of projections 27 are correlated with a different force needed to ride over said projections. The smaller an inclination, the easier it will be to mount a cover 10 and ensure its insertion into a final fastening position. In fact, by contrast with known mounting procedures, in this case a procedure always requires teeth 20 to be made to slide along grooves 24, using a typical bayonet coupling, in any direction of rotation. During mounting, a tooth 20 of a cover 10 encounters a second circumferential portion of flat surface 30, which has a lesser inclination, and a sliding of a tooth over a projection 27 takes place with less force. When it has ridden over the projection 27, a tooth 20 of a cover 10 will be definitively locked in a depression 26 by a corresponding mechanical stop 32, and will occupy a clearly defined position.

Consequently, a demounting of a cover can take place only in an opposite direction of rotation to that in which it has been mounted. In this case, a tooth 20 of a cover 10 will encounter a third circumferential portion of flat surface 31, which has a greater inclination. Evidently, the greater the inclination, the greater is a force required to demount a cover, and therefore a sliding of tooth 20 over a projection 27 will be greatly impeded, preventing the occurrence of accidental demounting.

Various designs of mechanical stops 32 are optimized so as to have a sufficiently large thickness S in a circumferential direction, with consideration of the size of the tooth 20 of the cover 10 and the circumferential space available in the annular groove 22 between two consecutive projections 27.

Figure 6:
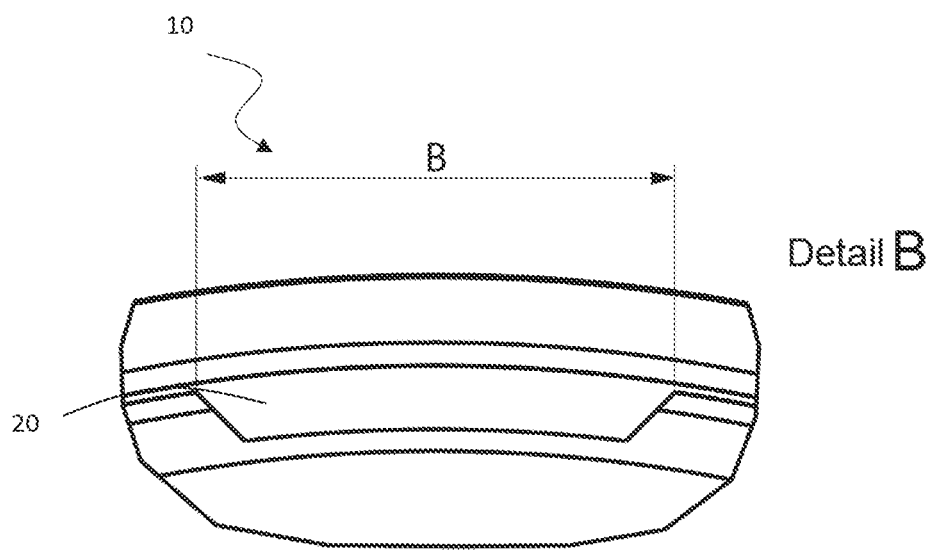
FIG. 6 shows a detail of FIG. 5 on an enlarged scale.

The thickness S may be calculated using the formula:

$$S = A - 2 \times B - G.$$

where:
A (see, e.g., FIG. 2) is the circumferential distance in an annular groove 22 between two consecutive projections 27,
B (see, e.g., FIG. 6) is the circumferential width of an tooth 20 of a cover 10,
G is a circumferential clearance between mechanical stops 32, teeth 20 and projections 27, allowing for the manufacturing tolerances on the parts.

A height H in the radial direction of mechanical stop 32 is determined with allowance for the fact that this projection protrudes in the radial direction with respect to a bottom wall 25 of an annular groove 22, and extends flush with a lateral surface 16 of a casing 3. Therefore, $$H=(D_{le}-D_h)/2$$

where:
$D_{le}$ (see, e.g., FIG. 2) is a diameter of a lateral surface 16 of a casing 3,
$D_h$ (see, e.g., FIG. 2) is a diameter of a bottom wall 25 of an annular groove 22.

The second and third circumferential portions of flat surfaces 30, 31 of projections 27, in other words two inclined planes with different inclinations, are designed by subdividing the circumferential length W of a whole projection 27 so that second portion 30 (the portion used in mounting) has a lesser inclination than that of third portion 31 (the portion used in dismounting). The circumferential length of a second portion 30, added to the circumferential length of half a first portion 29 (a raised flat surface), is denoted $W_m$, and the circumferential length of a third portion 31, added to the circumferential length of half a first portion 29, is denoted $W_d$. Experimental findings have shown that optimal performance is obtained when:

$$W_m=0.6W$$

$$W_d=0.4W$$

Upon a full reading of this disclosure, it will be appreciated that relatively small deviations from these optimal values may still provide desirable performance for many applications. To sum up, the introduction of mechanical stops results in simpler mounting and better sealing performance, due to the fact that teeth of a cover encounter a well-defined mechanical stop. This also results in greater protection against accidental demounting that may, for example, be caused by excessive vibrations in a specific application.

The second characteristic, namely the asymmetrical shape of the projections, also yields benefits as regards both mounting and accidental demounting. During mounting, the tooth of the cover must overcome a lesser inclination, making the operation simpler. However, the greater inclination encountered by the tooth of the cover in the direction of demounting makes accidental demounting much less common, thus improving the sealing performance of the support assembly.

In embodiments a support assembly for movable, rotating or sliding shafts, includes a bearing unit adapted to receive the movable shaft, a casing and a cover for fluid sealing an opening of an internal seat of the casing; the cover comprising an annular coupling portion towards a radially external lateral surface of the casing, the annular coupling portion being provided radially on the inside with at least one pair of teeth projecting radially towards the inside of the cover and spaced circumferentially from each other; the radially external lateral surface of the casing being provided with an annular seat for receiving the teeth of the cover, the annular seat consisting of: an annular groove arranged axially spaced with respect to a front edge of the casing delimiting the opening and connected to a number of axial grooves equal to the number of teeth present on the cover and which interrupt radially at least part of the front edge; and in a bottom wall of the annular groove which is circumferentially provided with an alternating plurality of depressions and projections, the projections being arranged circumferentially offset with respect to the axial grooves; the support assembly being characterized in that the annular groove has at least one pair of mechanical stops of the at least one pair of teeth of the cover, the mechanical stops extending in a radial direction with respect to corresponding depressions to be flush with the lateral surface of the casing.

In embodiments a support assembly's projections of the annular groove each comprise a first circumferential portion of flat surface raised with respect to the bottom wall of the annular groove and second and third circumferential sections of flat surface which flank the first section and which form two inclined planes that connect the first section of the surface with the bottom wall of the groove annular and in which the slope of the second section is less than the slope of the third section, thus assuming the projections an asymmetrical shape.

In embodiments a support assembly, wherein the number of mechanical stops is equal to the number of teeth of the cover.

In embodiments a support assembly, wherein the number of asymmetrical projections is equal to double the number of mechanical stops.

In embodiments a support assembly in which two asymmetrical projections are arranged circumferentially from the opposite band with respect to each mechanical stop and the third circumferential portion of flat surface circumferentially faces the mechanical stop.

In embodiments a support assembly, wherein the number of mechanical stops is equal to four and the number of asymmetrical projections is equal to eight.

In embodiments a support assembly, wherein a thickness (S) in the circumferential direction of the mechanical stops is equal to:

$$S=A-2\times B-G.$$

where:
A is the circumferential distance on the annular groove between two consecutive projections,
B is the circumferential width of the tooth of the cover,
G is a circumferential clearance between mechanical stops, teeth and projections.

In embodiments a support assembly in which the height (H) is equal to:

$$H=(D_{le}-D_h)/2$$

where:
$D_{le}$ is the diameter of the lateral surface of the casing,
$D_h$ is the diameter of the bottom wall of the annular groove.

In some embodiments, the circumferential length (Wm) of the second portion of the projection is equal to 0.6×W (the circumferential length of the asymmetrical projection).

In some embodiments, the circumferential length (Wd) of the third portion of the projection is equal to 0.4×W.

In addition to the embodiment of the invention as described above, it is to be understood that there are numerous other variants. It is also to be understood that these embodiments are described solely by way of example and do not limit the object of the invention or its applications or its possible configurations. On the contrary, although the description given above enables a person skilled in the art to implement the present invention according to at least one example of its embodiment, it is to be understood that numerous variations of the components described are possible without departure from the object of the invention as defined in the appended claims, which are interpreted literally and/or according to their legal equivalents.

We claim:

1. A sealing system comprising:
   a casing comprising:
      an internal seat;
      a front edge;
      an opening defined by the internal seat and the front edge of the casing;
      a radially external lateral surface defining an annular seat, the annular seat comprising:
         an annular groove axially spaced from the front edge and comprising one or more mechanical stops; and
         a plurality of axial grooves connected to the annular groove and interrupting radially at least part of the front edge, wherein the annular groove defines a bottom wall circumferentially provided with a plurality of projections spaced from one another and defining a plurality of depressions, wherein the projections are arranged circumferentially offset with respect to the plurality of axial grooves; and
   a cover comprising:
      a bottom wall; and
      an annular coupling portion axially distal to the bottom wall, wherein a radially inner surface of the annular coupling portion comprises a plurality of teeth projecting radially inward and spaced circumferentially from each other,
   wherein the annular seat is configured to receive the at least one pair of teeth of the annular coupling portion of the cover, and
   a number of axial grooves of the casing equals a number of teeth of the cover.

2. The sealing system of claim 1, wherein each projection of the plurality of projections comprises:
   a first circumferential portion of a flat surface raised with respect to the bottom wall of the annular groove; and
   second and third circumferential portions of the flat surface that flank the first circumferential portion of the flat surface and form two inclined planes connecting the first circumferential portion of the flat surface with the bottom wall of the annular groove,
   wherein a slope of the second circumferential portion is less than a slope of the third circumferential portion.

3. The sealing system of claim 1, wherein the one or more mechanical stops and the plurality of teeth of the cover are equal in number.

4. The sealing system of claim 2, wherein a number of projections is double a number of mechanical stops.

5. The sealing system of claim 4, wherein,
   the plurality of projections comprises two projections,
   the two projections are spaced circumferentially such that the mechanical stop is circumferentially between the two projections, and
   the third circumferential portion of the flat surface circumferentially faces the mechanical stop.

6. The sealing system of claim 4, wherein the number of mechanical stops is equal to four and the number of projections is equal to eight.

7. The sealing system of claim 1, wherein a circumferential thickness (S) of each mechanical stop is equal to:

$$S = A - 2 \times B - G$$

wherein,
A is a circumferential distance between two adjacent projections measured along the annular groove,
B is a circumferential width of each tooth of the cover, and
G is a circumferential clearance between each mechanical stop, each tooth, and each projection.

8. The sealing system of claim 1, wherein a height (H) of each mechanical stop is equal to:

$$H = (D_{le} - D_h)/2$$

wherein,
$D_{le}$ is a diameter of the lateral surface of the casing,
$D_h$ is a diameter of the bottom wall of the annular groove.

9. The sealing system of claim 2, wherein a circumferential length of the second circumferential portion of each projection is equal to 0.6 times a circumferential length of the projection.

10. The sealing system of claim 2, wherein the circumferential length of the third circumferential portion of each projection is equal to 0.4 times a circumferential length of the projection.

* * * * *